United States Patent Office 2,887,166
Patented May 19, 1959

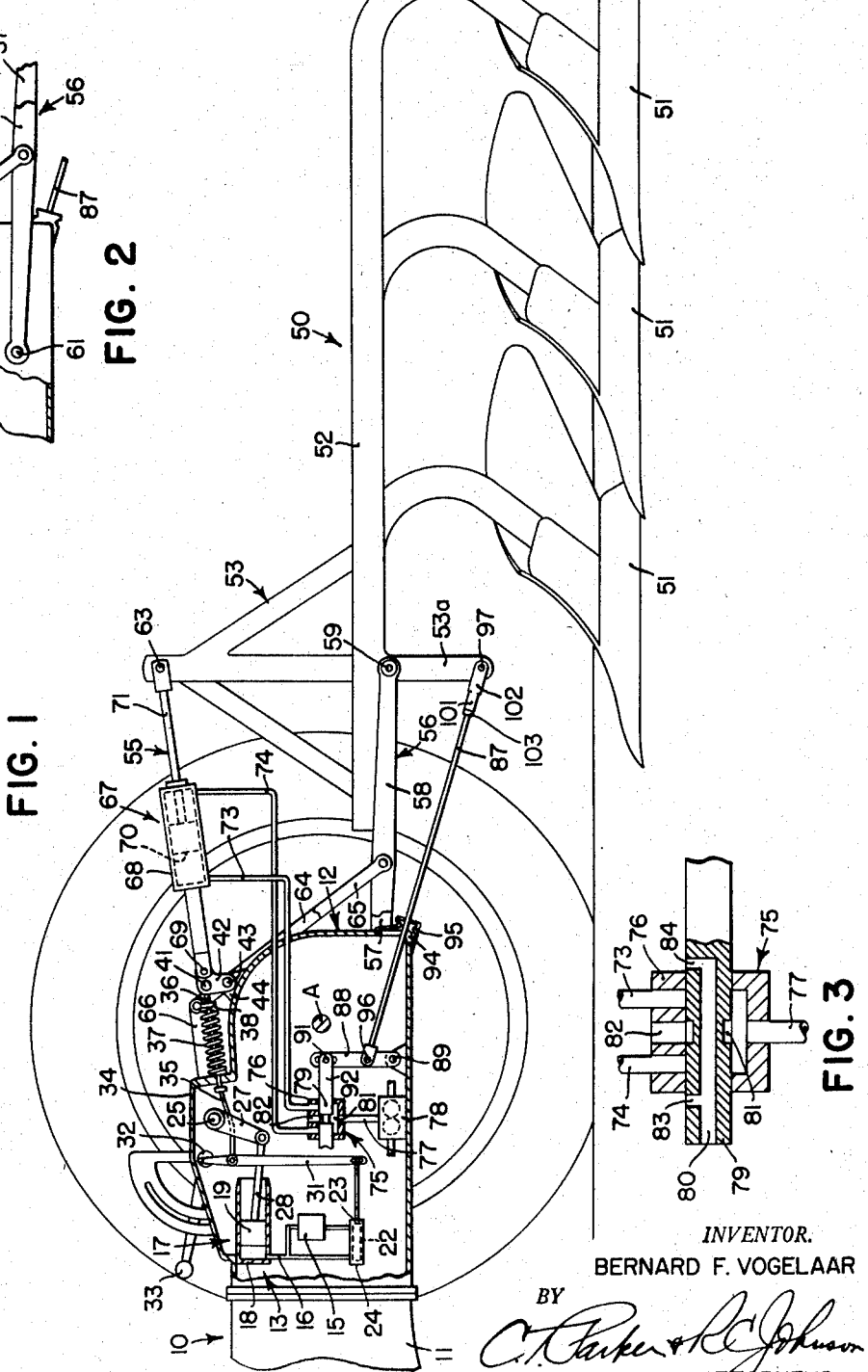

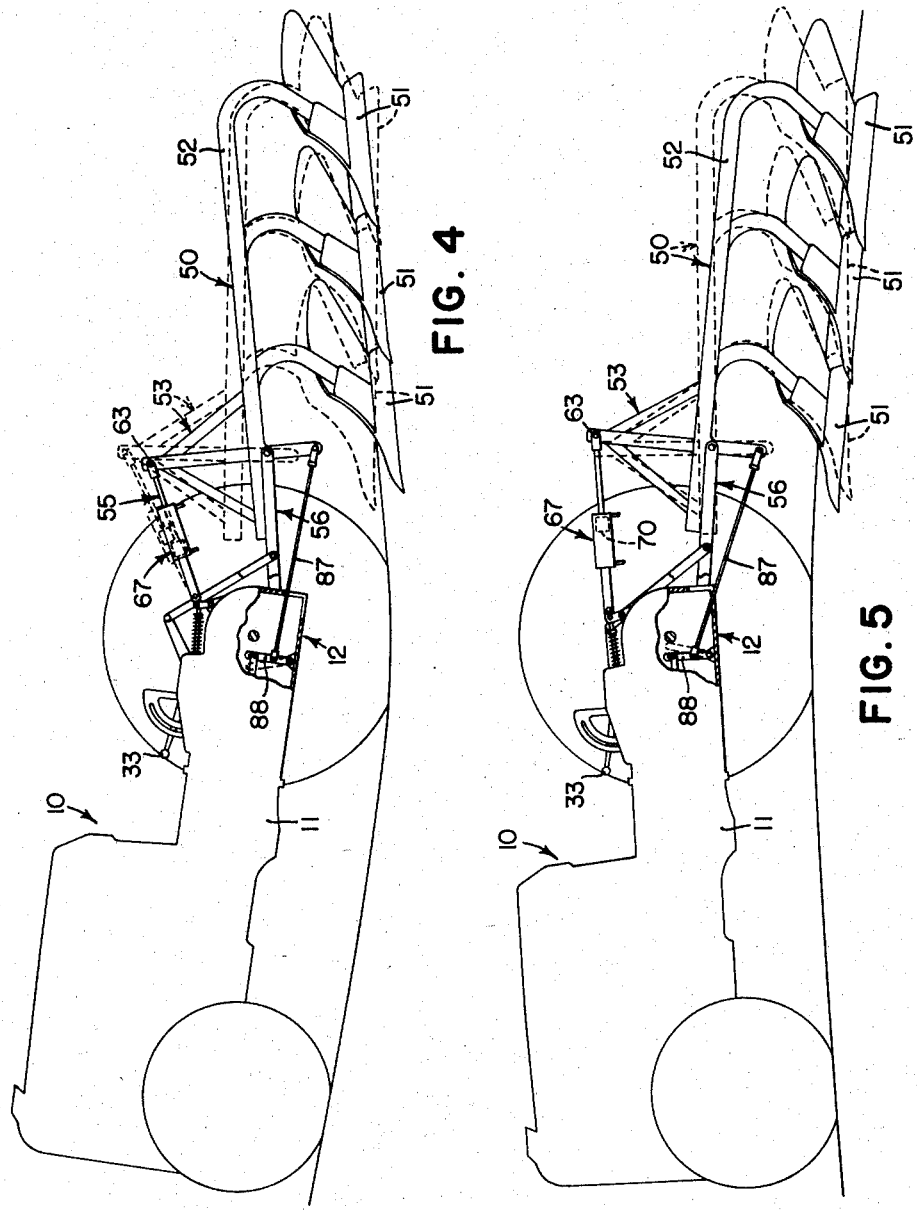

2,887,166

HITCH DEVICE

Bernard F. Vogelaar, Moline, Ill., assignor, by mesne assignments, to Deere & Company, a corporation of Delaware Continuation of application Serial No. 272,099, February 18, 1952. This application June 6, 1956, Serial No. 589,796

16 Claims. (Cl. 172—9)

This application is a continuation of my copending application, Serial No. 272,099, filed Feb. 18, 1952, now abandoned, and the invention relates generally to agricultural implements and more particularly to means for connecting a ground-working implement to a tractor.

The object and general nature of the invention is the provision of a new and improved hitch embodying means for maintaining the operating position of the implement in proper relation to the surface of the ground irrespective of pitching of the tractor relative to the implement during operation over uneven terrain, as through swales, over ridges or the like. Ordinarily, when a tractor pitches, two undesirable results follow. First, the implement is caused to assume an incorrect position, and second, the implement is caused to operate at an incorrect depth, particularly with relatively long implements such as three- or four-bottom plows, for example. Therefore, the invention is particularly adapted for use in connecting relatively long implements to a tractor.

More specifically, it is an object of the invention to provide hitch mechanism for compensating for the pitch of the tractor, wherein the hitch is so constructed and arranged that, in effect, the implement pivots about an actual or a virtual center or hitch pivot selected to secure the optimum operation. For example, in a three element linkage the arrangement may be such that the implement pivots about an axis that corresponds to the attaching points of the lower hitch links, with means for tilting the implement fore-and-aft, as by lengthening or shortening the upper link, for example, in response to relative movement between the implement and the lower links.

These and other objects and advantages of the present invention will be apparent from the following detailed description, taken in conjunction with the accompanying drawings, in which:

Figure 1 is a side view of a tractor and plow outfit, partly in section, embodying the invention;

Figure 2 is a fragmentary view showing the relative positions of the lower links of a three-link hitch and the pitch control link connection;

Figure 3 is a fragmentary view of the pitch compensating valve structure; and

Figures 4 and 5 are views similar to Figure 1 but showing in full lines the pitch-compensated positions of the hitch and control parts when the tractor pitches upwardly or downwardly, as when passing over ridges, through swales or the like, the dotted lines representing the positions the parts would occupy without the pitch-compensating mechanism.

The tractor 10 is of conventional construction, embodying power lift apparatus similar to that shown, for example, in U.S. Patent 2,356,231 to H. G. Ferguson, issued August 22, 1944. Generally, the tractor comprises a body 11 which includes a rear axle section 12 and a power plant from which energy is derived for actuating a power lift unit or device 13.

The power lift unit 13 comprises a pump 15 operative to deliver fluid under pressure through a conduit 16 to a one-way hydraulic unit 17 including a cylinder 18 and a piston 19. A valve or actuator 22 controls the operation of the lift device by controlling an inlet port 23 on the suction side of the pump and an outlet port 24 which opens the pump and the conduit 16 to the sump which surrounds the pump. A rockshaft 25 is mounted on the rear portion of the tractor body 11 and has an interior arm 27 connected through a connecting rod 28 with the piston 19. A valve lever 31 is pivotally connected at its lower end with the valve 22 and at its upper end is pivotally connected to an eccentric 32 fixed to a shaft controlled by a valve control arm 33 that is supported for rocking movement on a part 34 of the tractor body. The valve lever 31 is connected between its lower end and the eccentric 32 by a rod 35 to a plunger 36 that is biased for outward movement by a spring 37 acting at one end against a head 38 carried at the outer end of the plunger 36 and acting as at its inner end against a portion of the tractor body. The head 38 is pivotally mounted by a pin 41 on a pair of fore-and-aft swingable links 42 supported at 43 on a lug 44 carried on the rear axle structure 12. The mechanism just described forms the principal parts of the draft reaction control of the tractor 10.

An implement 50 is shown, by way of illustration, as a three-bottom plow having three furrow openers 51 and a frame 52 which includes, adjacent to the forward end thereof, a vertical bracket or mast structure 53. The implement is connected with the tractor 10 through draft-transmitting means or three-element linkage having upper and lower links 55 and 56, the latter link means including laterally spaced apart link members 57 and 58, the rear end of each being universally connected to laterally extending trunnion means 59 carried by or forming a part of the implement mast structure 53. Associated with the trunnions 59 are ball and socket connectors which are conventional in this type of construction, permitting the implement to shift laterally relative to the link members 57 and 58 as well as to swing or tilt in a vertical fore-and-aft extending plane about the transverse axis defined by the trunnions 59. The forward ends of the link members 57 and 58 are also connected with the tractor by ball and socket means 61 defining a transverse axis about which the link members 57 and 58 may swing when the implement 50 moves in a generally vertical direction relative to the tractor. The rear end of the upper link 55 is also connected with the upper portion of the mast 53 by a universal or ball and socket type of connector 63. Lift links 64 and 65 are respectively connected at their upper ends to power lift arms 66 fixed to the outer ends of the rockshaft 25.

The draft linkage is modified by the present invention to embody fore-and-aft tilting means including a pitch compensator cylinder and piston unit 67 preferably incorporated in and forming a part of the upper link 55. This unit or device comprises a cylinder 68 connected at its forward end at 69 to the bell crank 42 and a piston 70 having a rearwardly extending piston rod 71 which forms the principal part of the upper link 55. Conduits 73 and 74 lead respectively from the front and rear ends of the cylinder and into the tractor body to a pitch compensator valve unit or actuator 75 separate from the actuator or valve 22. This valve unit comprises a valve body or housing 76 to the interior of which fluid under pressure is delivered by a conduit 77 that extends upwardly from a second pump unit 78. A cylindrical valve member 79 having an axial bore 80 is slidable in the valve housing 76 and has a central annular port 81 that provides communication between the inlet side of the housing 76 and an outlet port 82 thereof, whereby, in the central or neutral position of the valve member 79, fluid may flow without appreciable restriction from the inlet conduit 77 to the valve housing and out the outlet 82 to a suitable reservoir, which may be the same reservoir mentioned above. The valve member 79 also has a pair of control ports 83 and 84 which communicate with the bore 80 and which have outer ends spaced axially of the bore 80 so that, in the central position of the valve member 79, fluid flow in the conduits 73 and 74 is blocked, and therefore the piston 70, when the valve 79 is in its central or neutral position, is hydraulically locked in the cylinder 68, and the link member 55 acts as a force-transmitting connection between the upper end of the mast 53 and the tractor. When the valve member 79 is shifted, the central port 81 is connected selectively to one of the conduits 73 or 74 and the other conduit is connected with one of the ports 83 or 84 so that fluid may exhaust through the bore 80 in the valve member 79 to the reservoir. At the same time, the central aperture or port 81 remains in constant communication with the inlet conduit 77 from the pump 78 and is connected with the other of the conduits 73 or 74 to direct fluid under pressure to one end or the other of the cylinder 66 to extend or retract the link member 55.

The valve 79 is controlled by and moves in response to movement of the implement relative to the lower link 56 about the transverse axis defined by the trunnions 59. For this purpose, the mast or bracket 53 is extended downwardly, as at 53a, and a valve link 87 is pivotally connected at its rear end to the lower portion of the mast extension 53a and is pivotally connected at its forward end to a fore-and-aft swingable lever 88, the lower end of which is pivoted at 89 to the tractor body and the upper end of which is pivoted at 91 to the rear end of a shank or extension 92 formed on or connected to the valve 79. The valve link 87 passes through an opening 94 in the tractor body and is sealed at this point by a suitable sealing means, such as a diaphragm 95, whereby the link 87 may swing not only vertically but also laterally relative to the tractor. The link 87 constitutes a movable part connected with the implement to operate the valve 79 in response to movement of the implement relative to the lower links 57 and 58.

The operation of the hitch device of the present invention is substantially as follows.

When the outfit is operating over substantially level ground, the pivot connection 96 between the front end of the valve control link 87 and the pitch compensator lever 88 lies substantially on the transverse axis 61 at the front ends of the lower tension link members 57 and 58, but it is to be understood that this location is not necessary and in some cases may even be undesirable. During travel of the outfit, the pull exerted by the tractor on the implement is transmitted through the lower links 57 and 58, and the implement reacts through the upper portion of the mast 53 and the presently solid upper compression link 55 against the upper portion of the tractor. This not only applies pressure to actuate the draft reaction control of the tractor, but, in addition, within the limits of the sensitivity of the pitch compensation valve means 75, provides for movement of the implement relative to the tractor about a relatively low, forwardly disposed virtual pivot point which lies at the intersection of the lines of the links 55, 57 and 58, extended.

When the implement swings upwardly or downwardly relative to the tractor, as when the outfit passes respectively through depressions or swales, or over ridges or the like, or when the draft-responsive mechanism operates to raise or lower the implement to compensate, momentarily or otherwise, for variations in the amount of draft, the pitch-compensating mechanism is caused to function because movement of the implement relative to the lower link means 56 transmits force through the valve control link 87 against the valve lever 88. This serves to shift the pitch compensator valve 79 in one direction or the other and causes the pump 78 to send fluid under pressure to the cylinder 68, thus serving as means responsive to changes in the position of the implement for extending or retracting the upper link 55 an amount sufficient to compensate for the swinging of the implement 50 relative to the tractor, with the result that the implement swings as a unit about the axis of the pivots 61 relative to the tractor. Thus, the implement remains properly positioned and approximately parallel with respect to the surface of the ground.

For example, Figure 4 shows the action of the parts when the outfit travels through a depresison or swale which, in effect, causes the front end of the tractor to pitch upwardly. Normally, with the conventional three-element linkage 55, 57 and 58, the plow would under these conditions tend to take a position somewhat as indicated in dotted lines, in which the front plow bottom would be or would tend to be entirely out of the ground whil the rearmost bottom would be operating at an excessive depth. In swinging toward the dotted-line position, the plow frame shifts relative to the lower link means 56 so as to exert a forward thrust through the link 87 to the valve operating arm 88, causing the valve link 92 and the valve member 79 to be shifted forwardly. The forward movement of the valve member 79 causes fluid under pressure to be directed from the high-pressure line 77 through the connection 74 to the rear end of the cylinder 68 of the pitch compensating unit 67. At the same time, the connection 73 is opened to the reservoir through the bore 80 and port 84. This causes the piston 70 to be forced toward the front end of the cylinder, thereby, in effect, shortening the upper link 55 and tipping the plow forwardly substantially to the position shown in full lines in Figure 4. The plow now operates at substantially uniform depth and substantially parallel to the surface of the ground.

Substantially the reverse action takes place when the outfit passes over a rise or ridge. As shown in dotted lines in Figure 5, the plow without the pitch-compensating means would tend to run deep at the front and shallow at the rear; but with the compensating mechanism, the movement of the plow toward the dotted-line position results in a rearward movement of the compensating valve actuating link 87, whereby the valve 79 shifts rearwardly so as to direct fluid under pressure into the forward end of the cylinder 68 and to exhaust fluid from the rearward end of the cylinder. The unit 67 thus extends the upper link 55 and thereby tips the plow correctively to the full-line position.

It will be understood that, although in the description above reference is made to the operation of the pitch compensating mechanism as acting to shift the plow from some position, such as that shown in dotted lines in Figures 4 and 5, to the respective positions shown in full lines, in actual operation, depending upon the sensitivity designed into the pitch compensating system, the plow will never achieve the dotted-line positions. Actually, the compensation takes place progressively in relatively small increments, the extent of which can be calibrated as desired in accordance with the amount of actual movement of the compensating valve actuating link 87 required to shift the valve from a neutral position to an operating position. If, for example, the sensitivity of the draft-responsive control of the tractor is greater than the sensitivity of the pitch compensating mechanism, then, within the limits of such differences in response, the draft control mechanism can raise or lower the plow without causing any resulting movement of the link 87 to bring the pitch compensating mechanism into operation. If such limits are, however, exceeded, then the pitch compensating mechanism superimposes its control upon the control provided by the draft-responsive mechanism without, however, disabling the latter since, in superimposing its control upon that provided by the draft-responsive mechanism of the tractor, the pitch compensating mechanism acts to cause the plow as a unit to swing relative to the tractor about the axis of the connections 61 (Figure 2), since in the neutral position of the valve 79, the points 59, 96 and 97 must lie in the relative positions shown in Figure 1. Therefore, the pitch compensating mechanism acts further to compensate for any tendency for the draft control mechanism to over-control for variations in draft that result from pitching of the tractor.

The feature of maintaining the implement in a position substantially parallel to the surface of the ground is particularly important in relatively long implements, such as a three-bottom plow, offset disk harrow, and the like. If implements of this kind are permitted to tilt or pitch forwardly or rearwardly the front and rear ground-engaging elements do not operate at the same depth, which would be objectionable, and additionally, the ground-engaging elements would have an undesirable tendency to run too deep or too shallow. Broadly stated, the invention provides means whereby the implement is, in effect, connected to the tractor at a hitch point that corresponds normally to the transverse axis defined by the pivot connections 61 and the pivot point 96 of the valve control rod 87 normally coincides with this axis. The draft reaction is transmitted from the implement to the tractor through the upper link 55 at all times, yet the pitch compensating means is available to maintain the implement in correct position relative to the ground, irrespective of the position of the tractor relative to the implement.

The valve control link 87 is preferably adjustable in length, as by being threaded at its rear end and adjustably connected to an interiorly threaded sleeve 101 forming a part of a yoke 102 that is connected at 97 to the lower mast section 53a, a lock nut 103 or the like being provided for maintaining the desired adjustment. Ordinarily, the valve control link 87 is adjusted in length for the desired working depth and minor variations therefrom do not materially affect the proper operation of the implement. The transverse axis passing through the front ends of the draft links 57 and 58 and the pivot point 96 is disposed substantially directly underneath the rear axle A of the tractor, and hence is in such a position that pitching of the front end of the tractor relative to the implement has substantially no effect on the implement, since the action of the pitch compensator valve 79 and associated parts is such that the effective length of the upper link 55 is varied to automatically correct the position of the implement even though the implement as a unit may be considered as swinging generally vertically, relative to the tractor, about the transverse axis that passes through the front ends of the draft members 57 and 58 and the pivot point 96.

While I have shown and described above a preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. For use in connecting an implement to a tractor, the improvement comprising upper and lower link means adapted to be pivotally connected at its ends with said implement and tractor, respectively, for generally vertical swinging movement, controllable means for changing the effective length of the upper link means, a part connected with the implement and movable therewith relative to the lower link means, and means connected with said controllable means and with said part so as to be actuated by movement of the latter relative to said lower link means for actuating said controllable means in response to change in the position of the implement relative to the lower link means.

2. In a tractor for connection with agricultural implements, the combination of upper and lower hitch links trailingly pivoted at vertically spaced points on the rear end portion of the tractor and having means at their trailing ends for pivotal attachment at vertically spaced points to an implement, a hydraulic lift motor on the tractor connected to the links for swinging the same vertically, a first control valve disposed to be shifted in response to change in stress in one of said links for causing the hydraulic lift motor to raise or lower the links correctively to retain the implement draft load substantially uniform, a hydraulic link-control motor independent of the lift motor and connected to and acting through one of the links for tilting the implement about its pivotal attachment to the other of said links, and a second valve independent of the first valve and operative in response to pitching of the tractor relative to the implement for causing the link control motor to act through said one link for tilting the implement to compensate for said pitching of the tractor.

3. For use in connecting an implement to a tractor, the improvement comprising link means adapted to be pivotally connected at its ends with said implement and tractor, respectively, for generally vertical swinging movement, a controllable source of power adapted to be energized from the tractor, means adapted to be connected between the tractor and the implement and energized by said source of power for changing the position of the implement relative to the tractor, a part adapted to be connected with the implement at a point spaced from its pivotal connection with said link means, said part being moved whenever the implement moves relative to said link means, and means connecting said part with said source of power so as to actuate said position-changing means in response to changes in the position of said implement relative to said link means.

4. For use with an agricultural implement adapted to be connected with a tractor having a source of power, the improvement comprising lower tension link means adapted to be pivotally connected with the tractor for movement relative thereto about a transverse pivot axis and adapted to be pivotally connected with the implement also about a generally transverse pivot axis, compression link means adapted to be pivotally connected with the implement and the tractor at points spaced generally above said tension link means, means for changing the effective length of said compression link means, controllable power means connected to operate said length-changing means, a link connected at one end with said power means for operating the latter, and means for connecting the other end of said link with said implement at a point spaced from its connection with said lower link means, whereby said link serves to actuate said length-changing means in response to movement of said implement about the point of its pivotal connection with the rear end of said tension link means.

5. For use with an agricultural implement adapted to be connected with a tractor having a source of power, the improvement comprising lower tension link means adapted to be pivotally connected with the tractor for movement relative thereto about a transverse pivot axis and adapted to be pivotally connected with the implement also about a generally transverse pivot axis, compression link means adapted to be pivotally connected with the implement and the tractor at points spaced generally above said tension link means, means for changing the effective length of said compression link means, controllable power means connected with said length-changing means, a member adapted to be connected with the implement to move angularly therewith relative to said lower link means, and means connecting said member with said controllable power means for actuating the latter, whereby said power means is made responsive to variations in the angular position of said lower tension link means relative to the implement for operating said length-changing means so as to cause the latter to maintain a substantially constant angular position of the implement relative to said lower tension link means in any angular position of the tractor relative to the implement.

6. For use with an agricultural implement adapted to be connected with a tractor having a source of power, the improvement comprising lower tension link means adapted to be pivotally connected with the tractor for movement relative thereto about a transverse pivot axis and adapted to be pivotally connected with the implement also about a generally transverse pivot axis, compression link means adapted to be pivotally connected with the implement and the tractor at points spaced generally vertically above said tension link means, means for changing the effective length of said compression link means, a link connected at one end with said length-changing means, and means for connecting the other end of said link with said implement at a point spaced generally vertically from the point of connection of one of said link means with the implement, so as to operate said length-changing means in such a way that said implement is adapted to swing about the point of pivotal connection of said lower tension link while the draft reaction is transmitted through said compression link means to the tractor in all positions of the implement about said last mentioned point of pivotal connection as a center.

7. A hitch device for use in connecting an implement to a tractor, said device comprising link means adapted to be pivotally connected at its rear end to the implement to accommodate generally vertical swinging of the latter and to be connected at its forward end to the tractor for generally vertical swinging relative to the tractor about a generally transverse axis, controllable means adapted to be pivotally connected with the implement above said link means and with the tractor above said transverse axis whereby draft transmitted to the implement through said link means reacts through said controllable means against the tractor, means for changing the effective length of said controllable means, including a part adapted to be shiftably connected with the tractor, and a control link pivotally connected with such shiftable part and with said implement at a point spaced generally vertically from the point of connection of said link means with the implement, said control link being connected with said shiftable part at a point that normally lies on said transverse axis, whereby movement of said implement relative to said link means acts momentarily to shift said part and operate said controllable means to increase or decrease the effective length thereof and thereby change the position of the implement relative to the link means, changing the position of the implement acting through the control link to shift said part back into its normal position.

8. The invention set forth in claim 7, further characterized by said controllable means comprising an upper extensible and retractable link adapted to be pivotally connected between the implement and the tractor and piston and cylinder means for changing the effective length of said last mentioned link, and hydraulic means operatively connected with said piston and cylinder means to operate the latter, and controlled by movement of said shiftable part.

9. The invention set forth in claim 8, further characterized by said hydraulic means including a valve shiftable to one position to cause fluid under pressure to be directed to one side of said piston and cylinder unit and shiftable to another position to cause fluid under pressure to be delivered to the other side of said piston and cylinder unit, and means connecting said shiftable parts with said valve.

10. For use in connecting an implement to a tractor, the improvement comprising link means adapted to be pivotally connected at its ends with said implement and tractor, respectively, for vertical adjustment of the implement relative to the tractor and for fore-and-aft tilting of the implement relative to the tractor, first power means connected between the tractor and the implement for adjusting the implement vertically in response to changes in draft load thereon, a second power means independent of the first power means and connected between the tractor and the implement for tilting the implement fore-and-aft, controllable means connected to the second power means independently of the first power means, and signal means connected to the controllable means and operative in response to pitching of the tractor relative to the implement for actuating the second power means to forcibly tilt the implement in the corrective direction to compensate for said pitching.

11. For use with an agricultural implement adapted to be connected with a tractor having a source of power, the improvement comprising first link means adapted to be pivotally connected with the tractor for movement relative thereto about a transverse pivot axis and adapted to be pivotally connected with the implement also about a generally transverse pivot axis, second link means adapted to be pivotally connected with the implement and the tractor at points spaced generally vertically from said first link means, means for changing the effective length of the first link means, controllable power means connected to operate said length-changing means, a control link connected at one end to and for operating the power means, and means for connecting the other end of said control link with said implement at a point spaced from its connection with the second link means, whereby said control link serves to actuate said length-changing means in response to movement of said implement about the point of its pivotal connection with the rear end of said second link means.

12. For use with an agricultural implement adapted to be connected with a tractor having a source of power, the improvement comprising lower tension link means adapted to be pivotally connected with the tractor for movement relative thereto about a transverse pivot axis and adapted to be pivotally connected with the implement also about a generally transverse pivot axis, compression link means adapted to be pivotally connected with the implement and the tractor at points spaced generally vertically above said tension link means, means for changing the effective length of one of said link means, controllable power means connected to operate said length-changing means, a control link connected to one end to and for operating the power means, and means for connecting the other end of said control link with said implement at a point spaced from its connection with the other of said link means, whereby said control link serves to actuate said length-changing means in response to movement of said implement about the point of its pivotal connection with the rear end of said other link means.

13. In a tractor for connection with agricultural implements, the combination of draft linkage trailingly pivoted on the rear end portion of the tractor and having means for pivotal attachment to an implement to arrange the implement for vertical adjustment relative to the tractor, said linkage including provision for fore-and-aft tilting of the implement relative to said linkage and tractor, a lift device on the tractor and connected to the linkage for swinging the implement vertically, a first control actuator disposed to be shifted in response to change in stress in one of said links for causing the lift device to raise or lower the linkage correctively to retain the implement draft load substantially uniform, a pitch-compensating device independent of the lift device and connected to and acting on the implement for selectively holding the implement against fore-and-aft tilting and for correctively effecting such tilting of the implement, and a second actuator independent of the first actuator and operative in response to pitching of the tractor relative to the implement for causing the pitch-compensating device to correctively tilt the implement to compensate for said pitching of the tractor.

14. The combination with a tractor having pivoted tension and compression links and lift means for adjusting said links vertically, an implement adapted to be connected with said links to be propelled and vertically adjusted thereby, a power-actuated device separate from the lift means and incorporated in one of said links to tilt the implement relative to the tractor, controllable means connected with said device for operating the latter exclusively of the lift means, means connected with said implement and shiftable in response to pitching of the tractor relative to the implement, and means connecting said shiftable means with said controllable means for causing the latter to actuate said device exclusively of the lift means and thereby to tilt the implement so as to compensate for the pitching of the tractor.

15. The invention set forth in claim 14, further characterized by said power actuated device being incorporated in the compression link, and said shiftable means being pivotally connected with the implement at a point spaced generally vertically from the point of connection of said tension link with the implement.

16. For use in connecting an implement to a tractor, the improvement comprising link means adapted to be pivotally connected at its ends with said implement and tractor, respectively, for vertical adjustment of the implement relative to the tractor and for fore-and-aft tilting of the implement relative to the tractor, first power means connected between the tractor and the implement for adjusting the implement vertically, second power means independent of the first power means and connected between the tractor and the implement for tilting the implement fore-and-aft, controllable means connected to the second power means independently of the first power means, and signal means connected to the controllable means and operative in response to pitching of the tractor relative to the implement for actuating the second power means exclusively of the first power means to forcibly tilt the implement in the corrective direction to compensate for said pitching.

References Cited in the file of this patent

UNITED STATES PATENTS

| | | |
|---|---|---|
| 2,405,980 | Sands et al. | Aug. 20, 1946 |
| 2,455,727 | Bunting | Dec. 7, 1948 |
| 2,631,515 | McRae | Mar. 17, 1953 |
| 2,642,846 | Morgen | June 23, 1953 |
| 2,665,622 | Bunting | Jan. 12, 1954 |
| 2,755,721 | Rusconi | July 24, 1956 |

FOREIGN PATENTS

| | | |
|---|---|---|
| 541,436 | Great Britain | Nov. 26, 1941 |